Nov. 5, 1929.  E. M. BOUTON  1,734,198
SYSTEM OF CONTROL
Filed Oct. 14, 1924
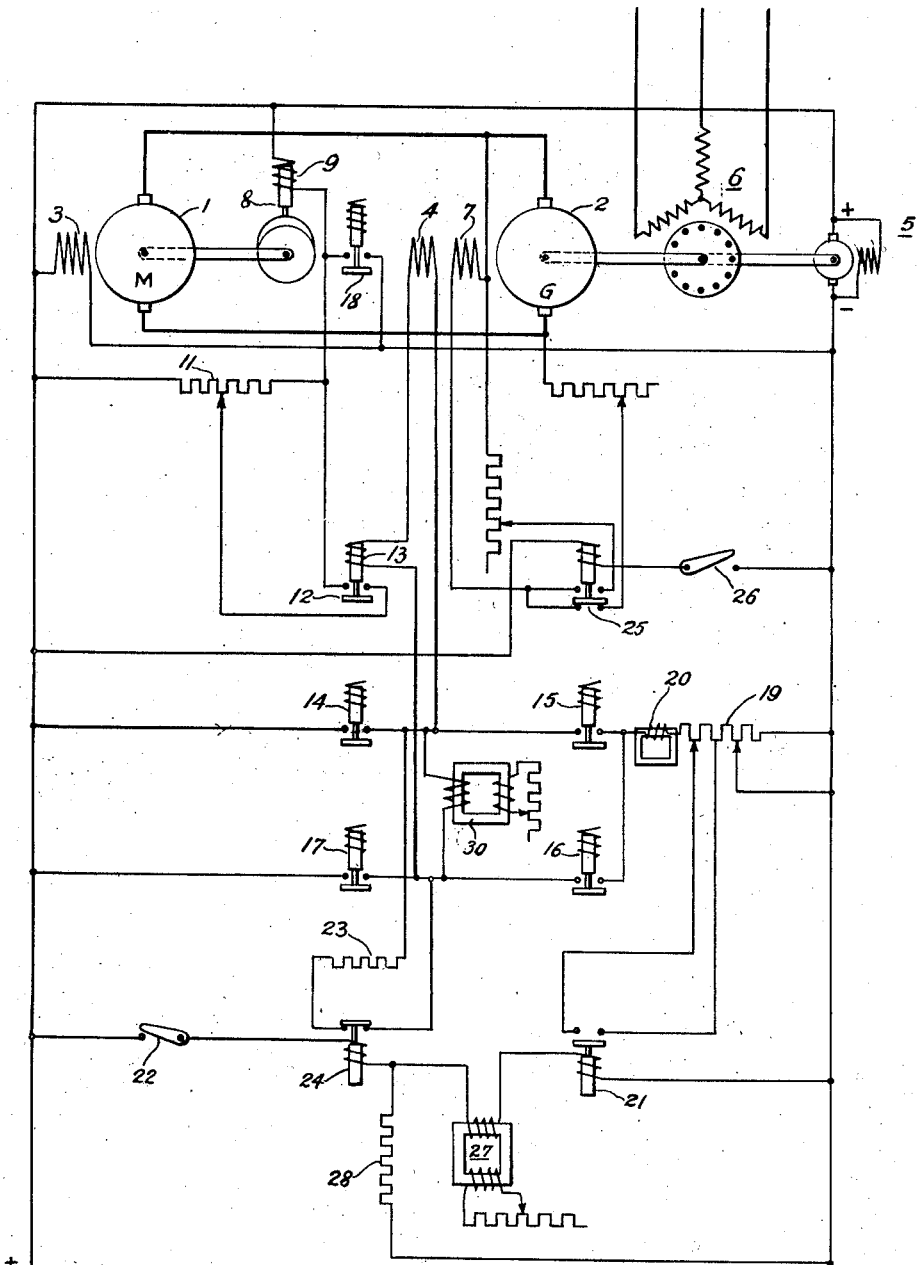
WITNESSES:
INVENTOR
Edgar M. Bouton
BY
ATTORNEY Patented Nov. 5, 1929

1,734,198

UNITED STATES PATENT OFFICE

EDGAR M. BOUTON, OF EAST PITTSBURGH, PENNSYLVANIA, ASSIGNOR TO WESTINGHOUSE ELECTRIC & MANUFACTURING COMPANY, A CORPORATION OF PENNSYLVANIA

SYSTEM OF CONTROL

Application filed October 14, 1924. Serial No. 743,512.

My invention relates to systems of control and it has particular relation to such systems as are employed in connection with elevators, hoists and similar machines.

An object of my invention is to improve the operation of a variable-voltage control system so as to eliminate shocks, occasioned by unskillful handling.

Another object of my invention is to provide an improved control for the electromagnetic braking mechanism.

Other objects of my invention will be made apparent by the following specification and the appended claims.

My invention will be described in connection with the accompanying drawing in which the single figure is a diagrammatic representation of circuits and apparatus embodying my invention.

With reference to the accompanying drawing, a motor having an armature 1 is connected in a loop circuit with a generator also having an armature 2. Separately excited field-magnet windings 3 and 4 are provided for the motor and generator, respectively. Suitable excitation for the field-magnet windings and for the operation of various control devices is provided by means of an exciter 5 which is directly connected to the armature 2 of the generator. Suitable means, such as the illustrated induction motor 6, is provided for driving the generator and the exciter. An auxiliary generator field-magnet winding 7 is differentially wound, with respect to the winding 4, and is excited, during dynamic braking, to effect demagnetization of the generator. During normal operation the winding 7 is connected to form a closed circuit in order that it may act as a "damper-winding" to prevent too rapid changes in field flux of the generator.

A suitable electromagnetic brake 8, having an operating coil 9, is provided for controlling the motor armature in a familiar manner. A brake discharge resistor 11 is connected in parallel relation to the coil 9, and a relay 12, having an operating coil 13, is connected to shunt a portion of resistor 11 when the generator field-winding 4 is energized to a predetermined degree. By this means, the "setting" of the brake may be controlled as hereinafter set forth. Reversing means comprising switches 14 to 17, inclusive, is provided for the field winding 4. The switches 14 to 17, together with a brake switch 18, may be controlled by means of a master switch in the customary manner. The generator field excitation may be controlled by means of an adjustable resistor 19. An inductance device 20 is also connected in circuit with the field winding 4. A speed relay 21 is connected for controlling a portion of field resistor 19. The relay 21 is controlled by master-switch contact members 22. A discharge resistor 23 is provided for the field winding 4 and is controlled by means of a relay 24 that is also under control of the master-switch contact members 22.

My invention will be best understood from the following description of operation. Assuming the apparatus to be in its illustrated and inactive condition, the motor 1 is started by the closure of reversing switches 14 and 16 and a simultaneous closure of brake relay 18. The generator now operates with minimum field excitation and with resistors 19 in series and 23 in parallel relation, respectively therewith. The extra field winding 7 is connected in a closed circuit by a relay 25 which is controlled by a manually operable switch 26. The winding 7, therefor, acts only as a damper-winding during normal excitation of the generator to assist in overcoming the effect of too rapid variation in field current. Manually operable switch 22 is next closed to energize relays 24 and 21, whereby resistor 23 is disconnected and a portion of resistor 19 is shunted. The effect of such operation, under ordinary circumstances, is to permit a sudden increase in generator field current. In this case, however, the rate of change of the flow of current is limited by means of the inductance device 20, thereby preventing a too abrupt strengthening of the generator field and having a corresponding effect upon the acceleration of the motor.

Whereas, the use of inductance connected in series relation with the field-winding 4 increases the time-element by adding to the inductance of the field, under other conditions it may be desirable to permit the field flux to increase more rapidly. By connecting an adjustable inductance 30 in parallel relation to the field-winding 4, the rate at which the winding becomes fully energized may be increased above the normal or inherent rate due to its own inductance. In other words, an inductance connected in parallel relation to a winding tends to decrease the inductive effect of said winding, whereas, a series-connected inductance adds to the inductive effect of said winding.

Deceleration of the motor is effected upon the opening of switch 22, whereupon relay 24 immediately connects resistor 23 in parallel relation to the generator field-winding 4. Relay 21 does not open simultaneously with the closure of relay 24 for the reason that I have provided an adjustable inductance device 27 and a suitable resistor 28 in circuit with the operating coil of relay 21. The time element of relay 21 may be, in this manner, adjusted over a considerable range of operation, as may be required to prevent a too sudden reduction in the generator field excitation.

It may be noted that relay 12 is arranged to close during the accelerating period and to remain closed as long as the excitation of the generator winding 4 exceeds a predetermined value. Therefore, during the period of deceleration, relay 12 remains closed and, when the brake relay 18 is opened, the counter E. M. F. of the brake coil 9 discharges through a portion of resistor 11. The time element of the brake coil may be adjusted by varying the amount of resistance in circuit therewith. This matter is of importance on account of two conditions of operation commonly encountered. When stopping from high speed, it is desirable to prevent the setting of the brake until deceleration has been effected by means of field control and dynamic braking. However, when "inching" the motor, it is necessary to permit quick application of the brake. This effect is insured, in the present instance, by providing that relay 12 will not be sufficiently energized to pick up during periods of inching and, therefore, the entire resistor 11 is connected in circuit and is preferably of such value as to have slight retarding effect upon the brake.

Switches 14 and 16, when open, disconnect the separately excited field-winding 4 and, simultaneously therewith, switch 26 may be opened to de-energize relay 25 and connect the auxiliary field winding 7 in circuit with the generator armature 2. The winding 7 is connected differentially with respect to winding 4 and is of such value as to overcome the residual magnetism of the generator field.

My invention provides a simple and effective variable-voltage control system that embodies a minimum number of control switches. The system is of such character that a large speed range or adjustment may be effected smoothly and without the necessity of particular care in the manipulation of the master switch.

I have illustrated my invention in simple form, and various modifications will be apparent to one skilled in the art. I desire, of course, that my invention shall be limited only in accordance with the scope of the appended claims.

I claim as my invention:—

1. The combination with an electric motor and a variable-voltage generator therefor, of means comprising a separately excited field-magnet winding for controlling the generator, a second field-magnet winding for effecting demagnetization of said generator, and means for rendering the second winding effective as a damper-winding throughout the accelerating period.

2. The combination with an electric motor and a variable-voltage generator therefor, of manually operable means for varying the generator voltage, means for automatically controlling said voltage during deceleration of said motor and means controlled in accordance with the generator excitation for regulating the braking of said motor.

3. The combination with an electric motor and a variable-voltage generator therefor, of manually operable means for varying the generator excitation, an electro-magnetic brake for said motor, and means controlled in accordance with the excitation of said generator for controlling said brake.

4. The combination with an electric motor and a variable-voltage generator therefor, of manually operable means for varying the generator excitation, an electro-magnetic brake for said motor, manually operable means for controlling said brake and means for controlling the setting of said brake in accordance with the excitation of said generator.

5. The combination with an electric motor and a variable-voltage generator therefor, of manually operable means for varying the generator excitation, an electro-magnetic brake for said motor, manually operable means for controlling said brake and a relay having a coil in circuit with a field winding of said generator for delaying the setting of said brake.

6. In a control system, a motor, a generator for supplying voltage to said motor, means for varying the voltage generated for varying the speed of said motor, means including a demagnetizing field winding for said generator, normally connected in a closed circuit to govern the rate of change of said voltage, and means for automatically connecting said winding across the armature of said generator when said generator is operated to stop said motor.

7. In a motor-control system, a motor, a generator for supplying voltage thereto comprising an armature, a separately excited field winding, means for controlling the excitation of said winding to control the speed of said motor, an additional field winding, and means for connecting said additional field winding in a closed circuit while said motor is operating to govern the rate of change of speed of said motor effected by said excitation controlling means and for connecting said additional field winding to said generator armature when said motor is to be stopped to act as a dynamic brake.

8. In a motor-control system, a motor, a generator for supplying voltage thereto, said generator including an armature, a separately excited field winding and an additional field winding, means for controlling the excitation of said separately excited field winding for varying the voltage supplied by said generator to said motor to start and stop said motor, means for connecting said additional field winding in a closed circuit to govern the rate of change of voltage under the influence of said excitation-controlling means and means operable in response to actuation of said excitation-controlling means to stop said motor for connecting said additional field winding across said generator armature.

In testimony whereof, I have hereunto subscribed my name this first day of October, 1924.

EDGAR M. BOUTON.